UNITED STATES PATENT OFFICE.

FREDERICK AUGUSTUS GENTH, OF PHILADELPHIA, PENNSYLVANIA.

IMPROVEMENT IN MANUFACTURE OF PHOSPHORIC ACID AND PHOSPHATES.

Specification forming part of Letters Patent No. 24,931, dated August 2, 1859.

*To all whom it may concern:*

Be it known that I, FREDERICK AUGUSTUS GENTH, of the city and county of Philadelphia, and State of Pennsylvania, have made a new and useful Improvement in the Process of Manufacturing Phosphoric Acid and Phosphates; and I do hereby declare the following to be a full, clear, and exact description of the same.

The employment of phosphates for agricultural purposes has rendered the production of phosphoric acid at a cheap a rate a great desideratum.

My improvement consists in obtaining phosphoric acid from the phosphates of iron, alumina, lead, &c.

To obtain phosphoric acid from the phosphates of the protoxide of iron, (vivianite, which is found in large quantities and which may be had at a cheap rate,) I grind the phosphate of iron in any convenient manner and treat it with oil of vitriol, (sulphuric acid,) in the proportion of about four parts of oil of vitriol to five parts, by weight, of phosphate of iron. I add about as much water as sulphuric acid. The phosphate of iron dissolves rapidly in the liquid. I permit it to stand for a day or so, when the sulphate of iron, formed by the union of the sulphuric acid and the iron, crystalizes in the form of the common copperas of commerce. The phosphoric acid remains as a liquid in an impure state, containing a small quantity of sulphate of iron. This phosphoric acid may be used in that condition, as hereinafter specified; or it may be first purified. The crystals of sulphate of iron are then removed and heat applied, which concentrates the solution and causes more sulphate of iron to crystallize out the concentrated phosphoric acid remaining. The phosphoric acid thus concentrated, though not chemically pure, is yet sufficiently so for use in connection with lime or phosphate of lime in order to produce phosphate or biphosphate of lime, respectively. If it were desired to purify the phosphoric acid still further in a chemical point of view, it can be done by the addition of sulphate of potash in small proportions—about ten per cent. of the sulphate of potash, by weight. If there be present any sulphate of the sesquioxide, it will unite and form a double salt, which will crystallize in the form of iron alum, leaving the phosphoric acid still purer.

Instead of employing sulphuric acid to dissolve the phosphate of iron in the first instance, muriatic acid might be used, but with less advantage. Muriatic acid could be used alone or in combination with the sulphates of alkalies.

Instead of using phosphate of iron, as first above specified, any other phosphate of iron or alumina may be used, either by themselves or mixed together as they are found in nature. From the sulphates of iron and alumina formed by the decomposition of the phosphates by sulphuric acid the phosphoric acid may be liberated by the addition of the sulphates and other salts of alkalies, which separate the above-mentioned sulphates in the form of alums.

Having thus described my improvement, what I claim as my discovery, and desire to secure by Letters Patent, is—

The process of manufacturing phosphoric acid or phosphates by treating the phosphates of iron, alumina, or lead, substantially as above described, by means of sulphuric acid or its equivalent.

F. A. GENTH.

Witnesses:
   J. G. MINICHILD,
   JOS. M. WILSON.